United States Patent [19]

Bhagavatula

[11] Patent Number: 4,768,853
[45] Date of Patent: Sep. 6, 1988

[54] OPTICAL FIBER DISPERSION TRANSFORMER

[75] Inventor: Venkata A. Bhagavatula, Big Flats, N.Y.

[73] Assignee: Corning Glass Works, Corning, N.Y.

[21] Appl. No.: 894,579

[22] Filed: Aug. 8, 1986

[51] Int. Cl.[4] .............................................. G02B 6/26
[52] U.S. Cl. .............................. 350/96.15; 350/96.16; 350/96.19; 350/96.31
[58] Field of Search ............... 350/96.15, 96.16, 96.18, 350/96.19, 96.29, 96.30, 96.31

[56] References Cited

U.S. PATENT DOCUMENTS

| | | | |
|---|---|---|---|
| 2,668,869 | 2/1954 | Iams | 350/96.12 X |
| 4,106,847 | 8/1978 | Arnaud | 350/96.31 |
| 4,165,152 | 8/1979 | Shiraishi et al. | 350/96.3 |
| 4,193,663 | 3/1980 | Timmermann | 350/96.18 |
| 4,229,067 | 10/1980 | Love | 350/960.31 X |
| 4,465,334 | 8/1984 | Siemsen et al. | 350/96.33 |
| 4,484,795 | 11/1984 | Byron | 350/96.19 |

FOREIGN PATENT DOCUMENTS 0067972  12/1982  European Pat. Off. ......... 350/96.15

*Primary Examiner*—John Lee
*Assistant Examiner*—John Ngo
*Attorney, Agent, or Firm*—William J. Simmons, Jr.

[57] ABSTRACT

An optical transmission system wherein light is transmitted from a transmitter to a receiver by at least one transmission optical fiber. The system includes a dispersion transformer which receives light from one of the components, compensates for or transforms the delay distortion of the various wavelengths transmitted through the system, and provides the next component in the system with a compensated or transformed light beam. The dispersion transformer comprises means for receiving light from one of the components and dispersing/separating the light into a plurality of spatially separated beams which are directed onto the endface of a multimode optical fiber. The position of each beam on the endface of the mutimode fiber is a function of the velocity with which the light that forms the beam propagates through the transmission optical fiber. The multimode fiber is characterized by a refractive index profile and a shape which are such that the modes excited therein are progagated therethrough with appropriate delays to generate an output pulse of desired width. Dispersion can be reduced or increased. Light emaninating from the multimode fiber is coupled to the next adjacent component of the system.

12 Claims, 5 Drawing Sheets

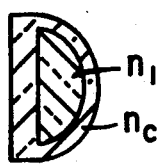 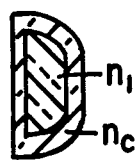 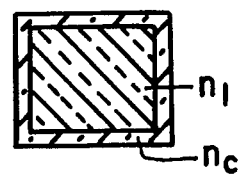
Fig. 10a  Fig. 10b  Fig. 10c
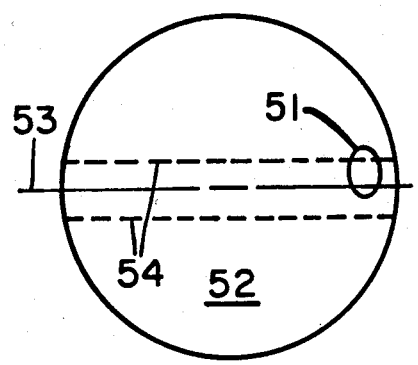 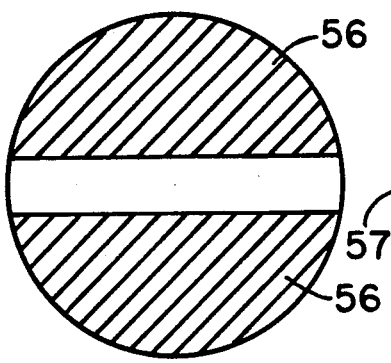 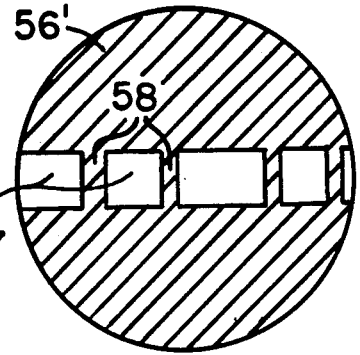
Fig. 11  Fig. 12a  Fig. 12b
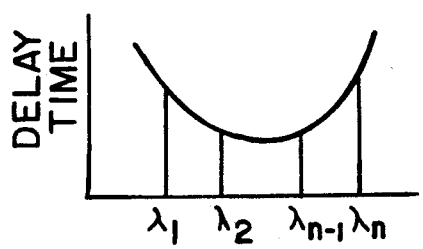 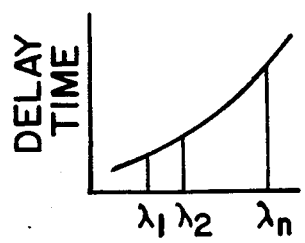 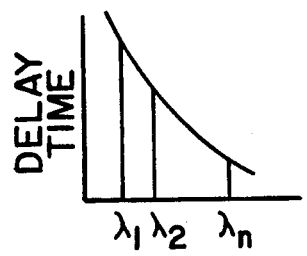
Fig. 13a  Fig. 14a  Fig. 15a
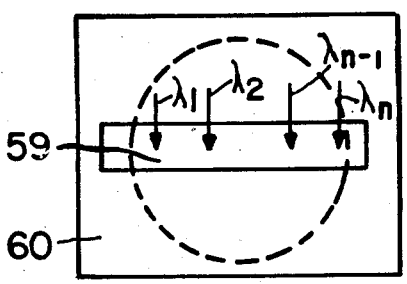 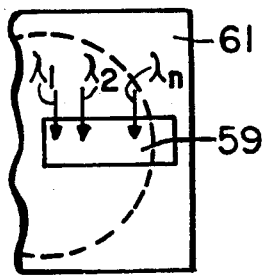 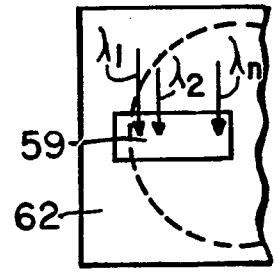
Fig. 13b  Fig. 14b  Fig. 15b

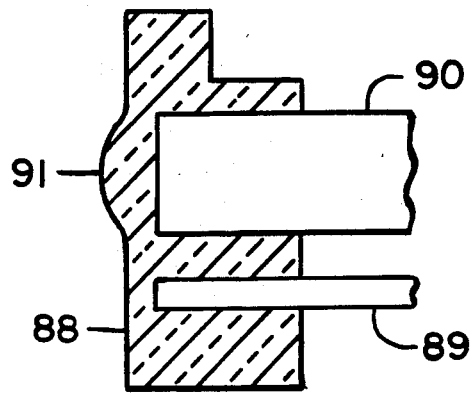
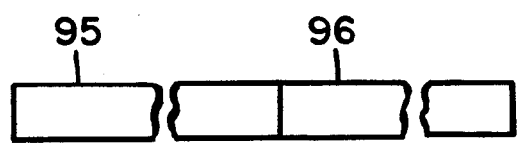
Fig. 22
Fig. 23

OPTICAL FIBER DISPERSION TRANSFORMER

BACKGROUND OF THE INVENTION

The present invention relates to the transformation or modification of dispersion in optical fiber transmission systems.

In single mode fibers, the delay time and hence dispersion, depends on wavelength. In general, light sources such as laser diodes have multiple wavelengths, and these different wavelengths travel at different speeds when propagating through a single-mode fiber. This leads to pulse broadening which depends on the source spectral width, the fiber dispersion and the length of the fiber. This pulse broadening can cause power to spread from one bit into an adjacent bit in a bit stream, an occurrence that can cause an error. The bit rate is therefore limited to that value beyond which bit error ratio is unacceptable. Initially, the procedure to overcome this problem was to put limitations on (a) the fiber dispersion, (b) the source wavelength and its spectral width and (c) the product of the bit rate times the repeater span length. These limitations can be relaxed if the delay differences introduced in the system can be compensated.

A system for compensating for dispersion in a single-mode system is disclosed in French Patent Publication No. 2,535,555. That system comprises a monochromator, an array of optical fiber delay lines and an optical signal detector. In a conventional manner, an optical signal generated by a source such as a laser diode is coupled to and transmitted through a single-mode transmission fiber. The monochromator receives the output light from the optical transmission fiber and spatially separates each longitudinal mode of the source. Each mode is injected into one of the short multimode fibers of the delay line array. The length of each short fiber is adjusted to compensate exactly the corresponding delay time induced in the link by its total chromatic dispersion. The ends of the short, delay line fibers converge on the photodetector.

The aforementioned compensator exhibits a dead space between adjacent cores of the delay line array. The multimode fibers of the delay line array include a layer of cladding material that constitutes a substantial part of the fiber. In addition, the fibers are of circular geometry. When such fibers are employed in the delay line array, a substantial part of the light directed thereon goes uncollected. For dispersion compensator applications, this type of array causes higher insertion loss; and more importantly, it causes additional bit errors in digital telecommunications applications. For example, in systems operating with Fabry-Perot laser sources, mode partition noise is ever present. In such a system, if the mode containing a substantial part of the bit-energy falls on the cladding, information is lost. Even if the array is originally aligned to capture all of the laser modes, bit errors can occur if there is frequency shift due to temperature or chirping effects. By minimizing the cladding thickness, such adverse effects can be minimized but not eliminated.

It is not always desirable to minimize dispersion and maximize bandwidth. For example, a customer may purchase the sole use of a single-mode optical fiber transmission line and connect its own terminal equipment thereto. The cost of using the transmission line may be based on the maximum data rate that the customer intends to transmit. The bandwidth of the single-mode fiber transmission line may be much greater than that currently needed by the customer. A dispersion transformer similar to that disclosed in the aforementioned French Patent Publication No. 2,535,555 can be employed to limit the bandwidth of the transmission line to that bandwidth for which the customer pays. This can be accomplished by utilizing the fiber delay line array to delay certain wavelengths received from the monochromator with respect to other wavelengths received therefrom so that the output pulse from the dispersion transformer is wider than the input thereto.

The term "dispersion transformer" as used herein refers to those systems which minimize or decrease dispersion as well as those which increase dispersion.

SUMMARY OF THE INVENTION

It is therefore an object of the present invention to provide a dispersion compensation system which is insensitive to temperature-induced source wavelength changes, chirping and the like. Another object is to provide a dispersion transformer which exhibits low insertion loss. A further object is to provide a dispersion compensation system having an improved bit error rate as compared with prior art compensation systems.

The system of the present invention is of the type that conventionally comprises a light source, a light detector, at least one transmission optical fiber connected between the source and detector, and a dispersion transformer disposed between any two of the aforementioned components. The dispersion transformer is characterized in that it comprises means for receiving light from one of the aforementioned components and dispersing or separating the light into a plurality of spatially separated beams. The position of each beam is a function of the velocity with which the light that forms the beam travels through the transmission optical fiber. The plurality of beams are directed onto a portion of an input endface of a multimode delay optical fiber, thus initiating in the multimode fiber the propagation of a plurality of modes which are propagated there-through at various velocities. The functions of dispersing light and directing the resultant beams can be performed by the same or different devices.

The above-described dispersion transformer is capable of functioning in either of two completely different modes. To minimize dispersion, those wavelengths of light which are propagated through the transmission fiber with the greatest delay are transmitted through the multimode delay fiber with the least delay and those wavelengths of light which are propagated through the transmission fiber with the least delay are propagated through the multimode delay fiber with the greatest delay. To increase dispersion, those wavelengths of light which are propagated through the transmission fiber with the greatest delay are preferably delayed even further by the multimode fiber. The light emanating from the multimode fiber is coupled to the next adjacent component of the system.

Fibers having various refractive index profiles can be employed as the multimode delay fiber, depending upon the characteristics of the light source and the transmission fiber. For example, the refractive index of the multimode delay fiber can vary in accordance with the equation $n(r)=n_0[1-\Delta(r/a)^\alpha]$, where $\alpha$ is the profile parameter. Such a profile is parabolically shaped when $\alpha$ is 2 and is step-shaped when $\alpha$ is infinity. The refractive index of the core may increase with increasing radius, or it may decrease with increasing radius. Alternatively, the refractive index could initially increase with increasing radius and thereafter decrease with increasing radius.

The multimode optical fiber can have any one of a plurality of cross-sectional shapes. It can be circular in cross-section, or it can have a non-circular cross-section such as rectangular.

Various types of optical devices can be employed for directing the beams onto a portion of the input endface of the multimode fiber such that the propagation of only meridional rays is initiated in the multimode fiber. A mask can be employed adjacent the input endface of the multimode fiber to prevent the transmission of light to the endface except through a diametrically extending slit. The slit may extend along the entire diameter of the endface or it may extend along only a radius thereof. Furthermore, the slit may consist of a plurality of segments that are separated by strips of masking material.

The means for directing beams onto a portion of the input endface of the multimode fiber can further comprise means for changing the angle of incidence and/or means for radially displacing the spatially separated beams.

In certain circumstances it may be effective to employ as the multimode optical fiber at least two segments which are connected end-to-end, the segments having different refractive index profiles.

BRIEF DESCRIPTION OF THE DRAWINGS

FIG. 10a through 10c illustrate some non-circular delay fiber cross-sections.

FIGS. 11, 12a and 12b show delay fiber endfaces, those of FIGS. 12a and 12b having a mask.

FIGS. 13a, 14a and 15a show time delay characteristics of different single-mode systems and FIGS. 13b, 14b and 15b show corresponding multimode masks to be used for such systems.

FIG. 22 is a cross-sectional view of a combination phase mask and fiber support.

FIG. 23 illustrates a technique for fine tuning a dispersion transformer.

DETAILED DESCRIPTION

Figure 1:
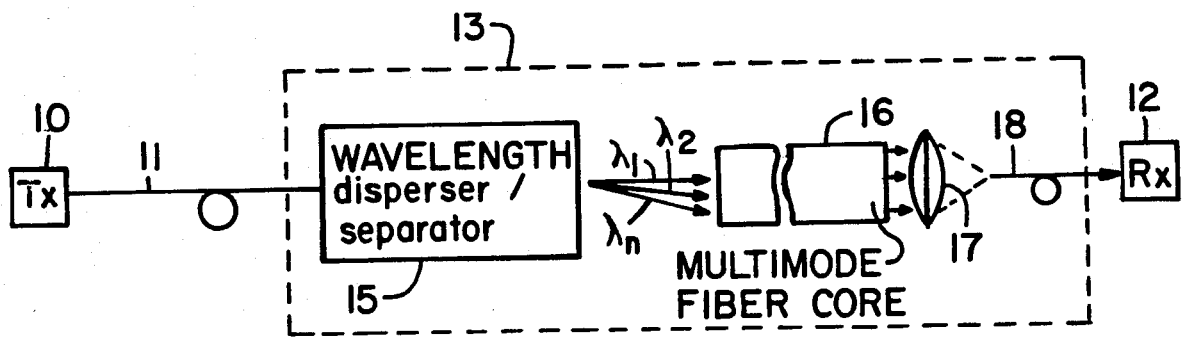
FIG. 1 is a schematic illustration of the dispersion transformer of the present invention.

The dispersion transformer of the present invention is shown in FIG. 1. Light from a transmitter 10 such as a laser diode or LED source is propagated through transmission optical fiber 11 which may comprise a single-mode or multimode fiber. In single-mode fibers, for example, the delay time and hence dispersion, depends upon wavelength. In general, laser diode sources emit light at multiple wavelengths and these different wavelengths travel at different speeds through fiber 11. If fiber 11 were coupled directly to detector or receiver 12, the output pulse fed to the receiver would be broadened to an extent depending upon the source spectral width, the fiber dispersion and the length of fiber 11.

In accordance with one aspect of the present invention, this pulse broadening is minimized by introducing a dispersion transformer 13 into the system. Dispersion transformer 13 may be connected between transmission fiber 11 and detector 12, as shown in FIG. 1, or it could be connected between source 10 and fiber 11. If two or more transmission fibers were connected in series, a dispersion transformer could be connected between two such fibers. Dispersion transformer 13 comprises wavelength disperser/separator means 15, which may consist of a passive optical device such as a grating, prism, filter, wavelength coupler to the like or an active device such as an acousto-optic modulator or the like. Means 15 is capable of separating the optical signal emanating from fiber 11 into a plurality of spatially separated wavelength components. Three such components are represented by arrows in FIG. 1. Wavelength components $\lambda_1, \lambda_2, \ldots \lambda_n$ are incident on the core portion of the input endface of multimode delay line fiber 16.

Since each wavelength component falls at a different radial position on the input face, each excites a different mode group $m_1, m_2$, etc. By selecting the proper index profile and length of multimode fiber 16, the delay differences between mode groups $m_1, m_2$, etc. can be made to substantially compensate for the difference in delay times between $\lambda_1$ and $\lambda_2$ etc. generated in the transmission fiber system. In this fashion, the chromatic dispersion introduced in a long fiber system can be nullified by intermodal dispersion in a shorter length of appropriately designed multimode fiber. An example of such a multimode fiber is a step or quasi step index multimode fiber. In such an $\alpha$-profiled fiber the model delay times are given by the well known formula $$\tau_m = \frac{n_o L_c}{c} \left\{ 1 + \left( \frac{\alpha - 2}{\alpha + 2} \Delta \left( \frac{m}{M} \right)^{2\alpha/\alpha + 2} \right) + \right.$$

$$\left. \left( \Delta^2 \frac{3\alpha - 2}{2(\alpha + 2)} \left( \frac{m}{M} \right)^{4\alpha/\alpha + 2} \right) + 0(\Delta^3) \right\} \text{ where}$$

$$M = \left( \frac{\alpha}{\alpha + 2} \right) a^2 n_o^2 k^2 \Delta$$

In these equations "m" is the mode number, "M" is the highest mode group that can propagate in the multimode fiber, "α" is the profile parameter (α=∞ for a step index fiber), "$L_c$ is the length of the multimode compensating fiber, "$n_o$" is the peak refractive index, "a" is the core radius, "k" is the wave number and Δ is the relative index difference.

Figure 2:
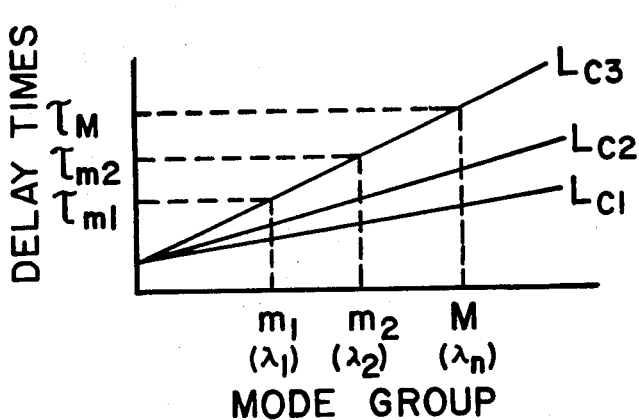
FIG. 2 is a graph of delay time plotted as a function of mode group for one type of multimode fiber.

For a step index fiber, for example, the delay time $\tau_m$ varies linearly as a function of (m/M) to a first approximation. The maximum delay difference $\tau_{mM}$ that can be achieved in such a fiber (the difference in the delay time $\tau_M$ of the highest order mode group and the delay time $\tau_1$ of the lowest order mode group) can be changed simply by selecting different lengths $L_c$ of the multimode delay fiber. A schematic diagram of this is shown in FIG. 2 wherein mode group $m_1$ has a delay time $\tau_{m1}$ mode group $m_2$ has a delay time $\tau_{m2}$ etc., and the highest order mode group M has a delay time $\tau_M$ for a multimode fiber length $L_{c3}$. FIG. 2 also illustrates that mode group $m_1$ is excited by wavelength component $\lambda_1$, etc. Shorter lengths $L_{c2}$ and $L_{c1}$ of multimode fiber will provide correspondingly smaller delay times for each mode group. Thus, this technique has the advantage of compensating different amounts of system delays by simply cutting multimode fibers to appropriate lengths.

Proper operation of this system requires the use of a multimode delay fiber that is free from mode coupling. This requirement can be met by selecting a multimode fiber having a sufficiently high value of Δ and by protecting the fiber in a safe enclosure. Furthermore, mode coupling is expected to be very small because of the short lengths (less than 1 km) required to compensate normal delay time differences encountered in high speed, long-haul systems, especially single-mode systems. For example, for a multimode fiber having a Δ of about 0.01, a delay difference of $\Delta\tau_{1-M} \approx 50$ ns/km is obtained between the lowest order and highest order modes. The delay difference for a high speed single-mode system with a source width of 5 nm, link length of 100 km and fiber dispersion of 10 ps/km·nm is approximately 5 ns. Hence, multimode delay fiber lengths no longer than 100 m will be necessary for such a single-mode transmission system.

The output from multimode fiber 16 can impinge directly upon light detector 12, or it could be focused upon the detector by a lens 17. Alternatively, the output from multimode fiber 16 could be focused onto the endface of a relay fiber 18 which transmits the light of detector 12, as shown in FIG. 1. The numerical aperture of relay fiber 18 should be higher than that of multimode fiber 16. The advantage of the arrangement of FIG. 1 arises from the fact that all components of dispersion transformer 13 could be precisely positioned within a housing from which only the end of relay fiber 18 and a short section of transmission fiber 11 extend. The two extending fibers are merely connected to a light detector and to the transmission fiber, respectively. Lens 17 and relay fiber 18 could be replaced by a tapered fiber having a large diameter endface adjacent multimode fiber 16 and a small diameter endface adjacent detector 12.

The preferred mode of operation described above effects minimal system dispersion. In accordance with another aspect of the invention, dispersion is increased in order to limit the data rate that can be transmitted by an optical fiber transmission system. For example, a single-mode optical fiber can be employed as the transmission fiber for a given customer. The bandwidth of the single-mode fiber may be larger than necessary to transmit the data rate for which the customer pays. The dispersion transformer of FIG. 1 can be employed to limit the bandwidth to the desired value. The wavelength component which has been delayed the greatest amount in the transmission fiber is delayed even further by multimode fiber 16. The width of the output pulse coupled to fiber 18 is thus even greater than the width of the pulse coupled to wavelength disperser/separator 15.

Figure 4:
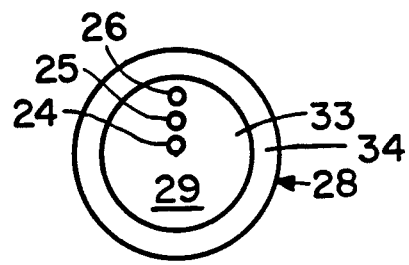
FIG. 4 shows the endface of the multimode fiber of FIG. 3.
Figure 3:
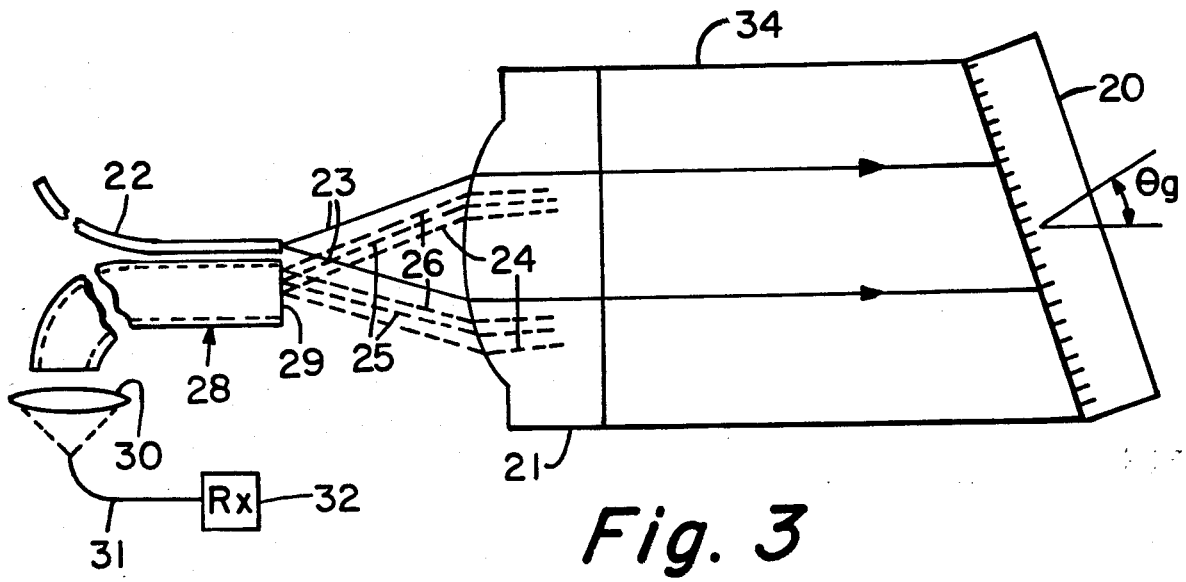
FIG. 3 shows one system for implementing the present invention.

Dispersion transformer 13 can be implemented in various configurations. In FIG. 3 there is employed a reflective grating 20 in near "Littrow" arrangement. The grating is blazed for operation at the system operating wavelength. When the transmission and the multimode delay optical fibers are properly oriented with respect to lens 21, light beam 23 emanating from single-mode transmission fiber 22 is collimated and is incident onto grating 20, and the spatially separated wavelength components of the dispersed input signal (dashed line beams 24, 25 and 26) are focused onto the endface 29 of multimode fiber 28. For the sake of simplicity only those portions of beams 24, 25 and 26 that emerge from lens 21 are shown. The dispersion transformer may include a glass cylinder 34 to which lens 21 and grating 20 are affixed, or the lens and grating can be suitably supported in air. Fibers 22 and 28 can be mounted on an x-y-z positioner with their endfaces in a common plane. The fibers are carefully positioned so that the axis of fiber 22 falls on the focal point of lens 21. When fiber 28 is correctly positioned, wavelength components 24, 25 and 26 will be focused on endface 29 as shown in FIG. 4, wherein core 33 and cladding 34 are also shown. It is to be understood that spaced circles 24, 25 and 26 are intended to be representative of any group of wavelength components that is formed by wavelength disperser/separator 15. Depending upon the specific light source employed at transmitter 10, the group of wavelength components can be a continuous spectrum of light or a discontinuous spectrum that results in a plurality of discrete beams.

In a production version of the dispersion transformer, fibers 22 and 28 could be potted or otherwise mounted in a plug which can be inserted into the transformer housing in such a location that the fiber endfaces are correctly positioned with respect to lens 21. The output from fiber 28 could be coupled by lens 30 to relay fiber 31, the output of which is directed upon receiver means 32.

In a specific example of a dispersion reducing system, a lens 21 with a 1 cm focal length in combination with a 600 line per mm grating can provide a linear resolution of about 0.1 nm/μm on the endface 29 of multimode fiber core 28. A multimode fiber core radius of 200 μm can provide a wavelength range up to 20 nm.

The length of the multimode fiber depends on the specifics of the system. For a fiber system with about 20 ps/km nm over a 25 km repeater spacing, the delay time to be compensated is 500 ps per nm of spectral coverage required. For a coverage of 20 nm, the total delay compensation required is 10 ns. For a multimode fiber like a step index fiber with an intermodal dispersion of abut 50 ns/km, only about 200 m of the fiber is required to compensate the system delay.

It is obvious that the wavelength coverage is continuous in the 20 nm range. Thus, any source, the wavelength components of which fall within that 20 nm range, can be employed in the system having that dispersion transformer. This is an advantage compared to a fiber array delay line transformer in which there can be "dead" spaces between the adjacent fibers of the array due to finite cladding thickness.

Figure 5:
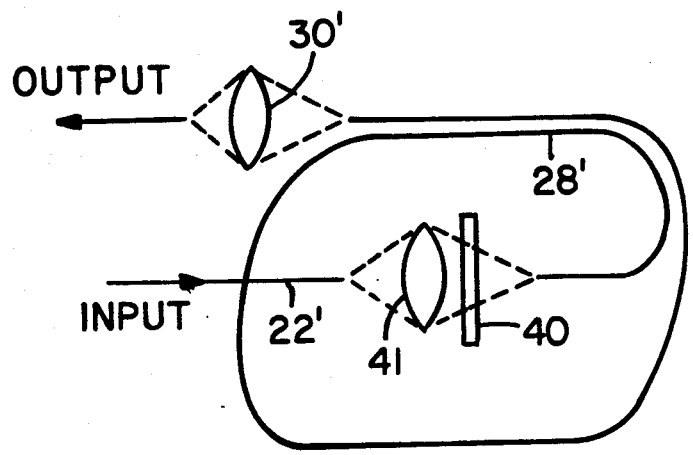
FIG. 5 shows another system for implementing the present invention.

In the embodiment of FIG. 5, wherein elements similar to those of FIG. 3 are represented by primed reference numerals, a transmissive grating 40 is employed. Light from single-mode transmission fiber 22' is coupled by lens 41, through grating 40 to multimode fiber 28'. This embodiment experiences less attenuation than that of FIG. 3 since the light from fiber 22' passes only once through lens 41. Also, in this configuration a demagnified image of the output from single-mode transmission fiber 22' can be imaged on multimode fiber 28'. This may improve the selectivity of mode excitation in the multimode fiber.

The functions of a plurality of the components of FIGS. 1, 3 and 5 can sometimes be performed by a single element. For example, a concave grating could both disperse light and focus light. Such a grating would therefore also perform the function of directing the dispersed beams of light onto the input endface of the multimode delay fiber. Also, whereas FIGS. 3 and 5 illustrate discrete three dimensional components, the dispersion transformer could consist of one or more planar devices to which the transmission fiber, the multimode fiber and the receiver are attached.

Figure 6A:
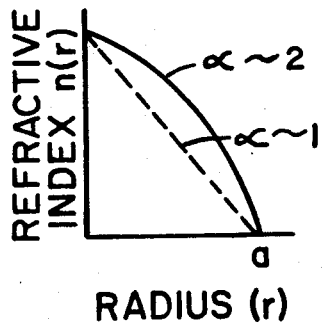
FIG. 6a through 6c are graphs illustrating refractive index v. radius, time delay v. mode group and time delay v. radius for two common fiber index profiles.
Figure 6B:
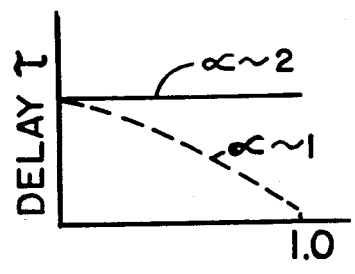
Figure 6C:
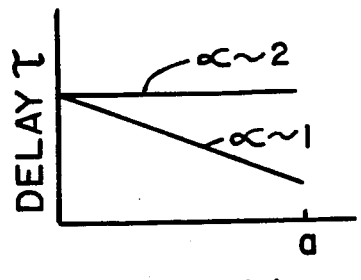

FIGS. 6a, 6b and 6c show refractive index profiles, delay v. (m/M) curves and delay v. radius curves for two common refractive index profiles. Although the $\alpha \sim 1$ and the $\alpha \sim 2$ graded index profiles are specifically illustrated, FIG. 6 is intended to be illustrative of any $\alpha$-type refractive index profile. Graded index profiles of the $\alpha$-type are characterized by the relationship $n(r) = n_0[1 - \Delta(r/a)^\alpha]$ for radii up to the core radius a. In FIG. 6b, the time delay of each wavelength component is plotted as a function of the quantity (m/M), the mode group excited by that wavelength component. For an $\alpha \sim 1$ profile the delay times are proportional to $(m/M)^{\frac{3}{2}}$ to a first approximation. In an $\alpha \sim 1$ graded index optical fiber, the particular mode group that is excited and thus the delay $\tau$ is a function of the angle that the incident light makes with the fiber axis as well as the radius at which the light impinges upon the endface. For small angles of incidence the quantity (m/M) is proportional to $(r/a)^{3/2}$. This leads to delay times that are proportional to (r/a) as shown in FIG. 6c.

The time delay v. radius relationship for the $\alpha \sim 1$ and $\alpha \sim 2$ profiles illustrated in FIG. 6c may not be satisfactory in all cases. By changing the index profile in a circular fiber or by changing the shape of the core, the delay time v. radius function of the multimode delay fiber can be modified to suit the requirements of the transmission fiber.

Figure 7:
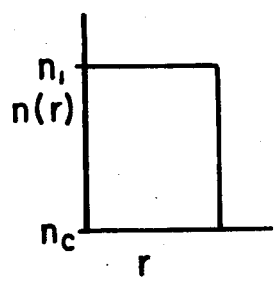
FIGS. 7, 8, and 9 illustrate other delay fiber refractive index profiles.
Figure 8:
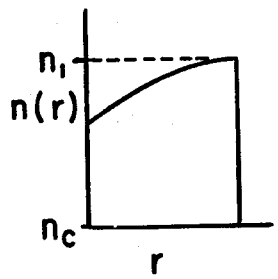
Figure 9:
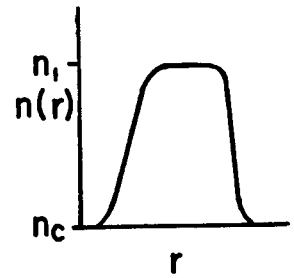

FIGS. 7, 8, and 9 illustrate a few of the various types of refractive index profiles that might be employed. FIG. 7 illustrates a step index profile. FIG. 8 illustrates a profile which increases monotonically with increasing radius. FIG. 9 shows a profile which initially increases and then decreases with increasing radius.

Some of the many possible non-circular multimode delay fiber shapes are shown in FIGS. 10a-10c. These shapes change the delay time characteristics as a function of radius. In addition, they may improve mode selectivity, reduce mode coupling and also facilitate the packaging. In these figures $n_1$ designates the core, and $n_c$ designates the cladding.

The wavelength components must be directed upon the multimode delay fiber endface within a predetermined distance from an endface diagonal or radius line, or extraneous modes may be generated. Referring to FIG. 11, the desired mode group will be excited if a wavelength component 51 impinges upon endface 52 within the predetermined distance from diameter 53 represented by dashed lines 54. If wavelength component 51 falls outside the area defined by lines 54, the extraneous mode that is generated in the multimode fiber may have a delay time different than that of the desired mode. To avoid this possibility, those areas of the endface beyond lines 54 are preferably covered by a mask 56 as shown in FIG. 12a. Any portion of a wavelength component that falls on mask 56 is absorbed or reflected. As indicated by FIG. 12b, there may be some instances where the opening or slit 57 in mask 56' is separated into two or more segments by narrow strips 58 of masking material. For example, strips 58 may be employed for absorbing light from a defocused beam which would otherwise initiate the propagation of unwanted modes in the multimode fiber.

Mask 56 could be formed directly on endface 52 by photographic techniques of the type employed to form precisely located layers on semiconductors. Moreover, because of the relatively large diameter of multimode delay fibers, a mask could also be made by conventional machining techniques. There is initially provided a tube, the inside diameter of which is just large enough to receive the end portion of a multimode delay fiber. A cap having an appropriately-sized slot or opening is affixed to the end of the tube. The cap can be formed of transparent material such as glass on which there is formed a mask of light-absorbing material by photographic techniques. Alternatively, the mask could be formed of a metallic sheet in which a slot or opening is cut.

The particular portion along the diameter of the multimode fiber endface upon which the wavelength components are directed depends upon the operating wavelength of the single-mode system. FIGS. 13a, 14a and 15a show the delay time characteristics of single-mode systems operated (a) near $\lambda_o$, the zero dispersion wavelength, (b) at the long wavelength side of $\lambda_o$, and (c) at the short wavelength side of $\lambda_o$, respectively. To compensate for such transmission fiber delay time characteristics, proper mode groups need to be excited in the multimode delay fiber. FIGS. 13b, 14b and 15b show a multimode fiber 59 with masks 60, 61 and 62, respectively, which are appropriately positioned for the systems represented in FIGS. 13a, 14a and 15a. The arrows in FIGS. 13b, 14b and 15b labeled $\lambda_1, \lambda_2 \ldots \lambda_n$ are indicative of wavelength component light beams propagating perpendicular to the endface of fiber 59 and incident thereon at the tips of the arrows.

Since the $\lambda_2$ and $\lambda_{n-1}$ components propagating through the fiber of FIG. 13a arrive relatively late, these wavelength components must be subjected to a relatively small delay in the multimode fiber. For a compensating fiber in which delay time increases as a function of radius, the $\lambda_2$ and $\lambda_{n-1}$ component beams can therefore be directed at regions of small radius on the multimode fiber endface as shown in FIG. 13b. Faster propagated components $\lambda_1$ and $\lambda_n$ impinge upon regions of greater radius. Mask 60 of FIG. 13b therefore has an opening that extends the entire diameter of the endface.

The dispersion in the transmission fiber represented by FIG. 14a is such that wavelength component $\lambda_1$ arrives later than the other indicated wavelength components. The $\lambda_1$ component must therefore excite a lower order or faster propagating mode in the multimode fiber and the $\lambda_n$ component must excite a higher order or slower propagating mode. Mask 61 shown in FIG. 14b, wherein only a radial region of the endface is exposed, facilitates the proper alignment of wavelength components with their radial mode excitation points. Similarly, it can be seen that mask 62 of FIG. 15b facilitates the proper radial location of the wavelength components propagated in the single-mode transmission fiber represented by FIG. 15a.

Also, adjusting the slit or opening width of a mask as compared with the radius of the core of the multimode fiber facilitates the preferential excitation of meridional rays, thereby improving the selective mode excitation. A balance between wavelength resolution, mode selectivity, fiber flexibility and alignment requirements needs to be obtained in designing the multimode fiber dispersion transformer. A core diameter of ~400 μm with 30-40 μm slit width is an example of such a balance. Even though the slits improve the performance, they are not essential in all cases to obtain selective excitation.

Figure 16:
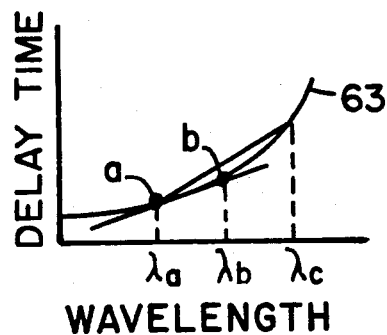
FIG. 16 is a graph of delay time plotted as a function of wavelength for a particular delay fiber.

In the above description, different index profiles, fiber shapes, etc. have been considered to match the modal delay times with the appropriate chromatic dispersion curves. To do this, each wavelength component of the source should excite a corresponding mode group. To a first approximation, this can be done by selecting a large core multimode fiber with suitable index profile and geometry. For example, for $\alpha$ close to 1, the delay time is proportional to the radial position for small incident angles. If the different wavelengths of the source get dispersed uniformly, the delay time will be proportional to the wavelength. In a small wavelength range this is sufficient as shown in FIG. 16. That portion of curve 63 between points a and b may be sufficiently linear to enable a multimode delay fiber characterized by curve 63 to operate between wavelengths $\lambda_a$ and $\lambda_b$. But over the wider wavelength range between wavelengths $\lambda_a$ and $\lambda_c$, the delay v. wavelength curve is slightly nonlinear. This could be corrected by fine tuning the index profile of the multimode fiber, i.e. by substituting for the fiber represented by curve 63 a fiber having a slightly different profile. System geometry could also be slightly modified to compensate for the nonlinearity of curve 63. For example, one could change the angle of incidence of the light beam on the grating.

Figure 18:
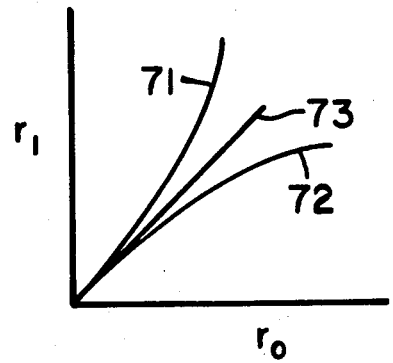
FIG. 18 is a graph which illustrates the radial displacement of an incident ray for various types of phase masks.
Figure 17:
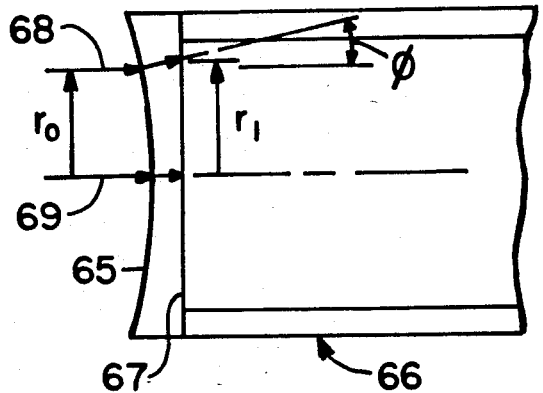
FIG. 17 shows a concave phase mask for radially displacing and changing the angle of incidence of an input light ray.

However, a simpler solution would be to employ a phase mask which corrects for the aforementioned nonlinearity. FIG. 17 shows a concave phase mask 65 adjacent the endface 67 of multimode fiber 66. Concave lens 65 functions to displace an off-axis ray 68 so that it impinges upon endface 67 at a radius $r_1$ that is greater than the radius $r_o$ at which the ray impinged upon the lens. It is noted that lens 65 also changes the direction of propagation of an off-axis ray by an angle $\phi$ which is a function of radius. The mask can be suitably shaped such that the angle $\phi$ and the radius $r_1$ are suitably varied as a function of $r_o$. By increasing the average angle of incidence with increasing radial position, mode selectivity increases. The relationship between $r_1$ and $r_o$ is shown in FIG. 18. Curve 71 shows the $r_o$ v. $r_1$ relationship for concave masks such as mask 65, whereas curve 72 illustrates the radius relationship for convex masks. For comparison purposes, curve 73 shows the linear $r_o$ v. $r_1$ relationship for a plate of uniform thickness; such a plate might form the transparent substrate of the slit masks of FIGS. 13–15.

Figure 19:
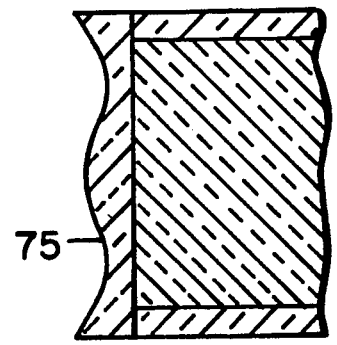
FIG. 19 shows a cross-sectional view of a compound phase mask.

Combinations of convex and concave surfaces can be obtained by proper design and thus correct for various kinds of residual delay differences. One such combination phase mask 75 is shown in FIG. 19.

Figure 20:
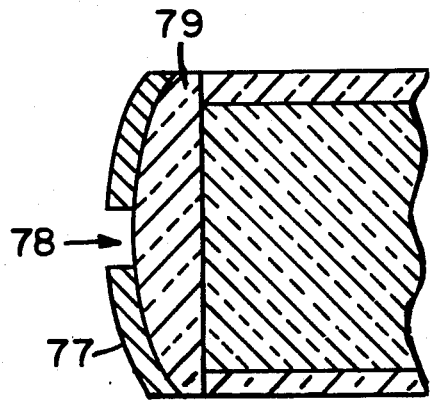
FIG. 20 is a cross-sectional view of a slit mask in combination with a phase mask.

A phase mask can function as the transparent substrate for a slit mask of the type illustrated in FIGS. 13–15. Such a combination mask is illustrated in FIG. 20 wherein opaque layer 77 having a diametrical slit 78 therein is formed on the surface of convex phase mask 79.

Figure 21:
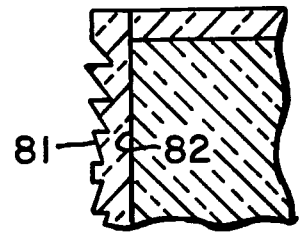
FIG. 21 is a further embodiment of a phase mask which does not radially displace incident rays.

A further mask configuration which is illustrated in FIG. 21 is similar to a zone plate in construction. It differs from the phase mask of FIG. 17 in that off-axis rays remain substantially undisplaced, i.e. $r_1$ is substantially the same as $r_o$ since the average thickness of mask 81 remains substantially constant. However, the angle at which an off-axis ray impinges upon phase mask 81 differs from the angle at which the ray impinges upon endface 82 by an angle $\phi$ which varies as a function of radius. Because of the serrated cross-section, it can be seen that $\phi(r)$ changes in discrete steps.

Molding technology can be used to make slit and/or phase masks from such materials as glass and plastic. FIG. 22 illustrates a plug 88 in which the end portions of single-mode transmission fiber 89 and multimode delay fiber 90 are mounted. Plug 88 is so shaped that it fits into a receptacle that is located in the system such that the ends of fibers 89 and 90 are precisely aligned with respect to such other optical components as lenses, gratings and the like. Integrally molded in plug 88 is a lens 91 which is axially aligned with respect to fiber 90. A slit mask (not shown) can be employed instead of lens 91, or it can be disposed over lens 91.

Another technique for forming phase masks is to shape the fiber endface by grinding/polishing techniques or melt/surface tension techniques. Other techniques such as etching and spin casting could also be used.

Another technique for fine tuning the delay curve is shown in FIG. 23. This involves joining two or more multimode delay fibers 95 and 96 which have different refractive index profiles and lengths to obtain a delay time versus radial position that substantially fully compensates for the chromatic dispersion of the transmission fiber.

I claim:

1. In an optical transmission system comprising the serial arrangement of the following components
    a light source,
    a light detector,
    at least one transmission optical fiber connected between said source and detector, and
    a dispersion transformer disposed between any two of the aforementioned components,
    said dispersion transformer being characterized in that it comprises a multimode optical fiber having a core, the refractive index of which increases with radius in at least the central portion thereof, means receiving light from one of said components and dispersing said light into a plurality of spatially separated beams, the position of each said beam being a function of the velocity with which the light that forms said beam propagates through said at least one transmission optical fiber, said means for receiving also directing said beams onto a portion of an input endface of said multimode fiber, the light emanating from said multimode fiber being coupled to the next adjacent component of said system.

2. An optical transmission system in accordance with claim 1 wherein said multimode optical fiber is characterized in that the refractive index of the core thereof initially gradiently increases with increasing radius and thereafter gradiently decreases with increasing radius.

3. In an optical transmission system comprising the serial arrangement of the following components
   a light source,
   a light detector,
   at least one transmission optical fiber connected between said source and detector, and
   a dispersion transformer disposed between any two of the aforementioned components,
   said dispersion transformer being characterized in that it comprises a multimode optical fiber having a non-circular cross-section, means receiving light from one of said components and dispersing said light into a plurality of spatially separated beams, the position of each said beam being a function of the velocity with which the light that forms said beam propagates through said at least one transmission optical fiber, said means for receiving also directing said beams onto a portion of an input endface of said multimode fiber, the light emanating from said multimode fiber being coupled to the next adjacent component of said system.

4. In an optical transmission system comprising the serial arrangement of the following components
   a light source
   a light detector
   at least one transmission optical fiber connected between said source and detector, and
   a dispersion transformer disposed between any two of the aforementioned components,
   said dispersion transformer being characterized in that it comprises a multimode optical fiber, means receiving light from one of said components and dispersing said light into a plurality of spatially separated beams, the position of each said beam being a function of the velocity with which the light that forms said beam propagates through said at least one transmission optical fiber, said means for receiving also directing said beams onto a portion of an input endface of said multimode fiber, said means for directing said beams comprising means for initiating propagation of only meridional rays in said multimode optical fiber, the light emanating from said multimode fiber being coupled to the next adjacent component of said system.

5. An optical transmission system in accordance with claim 4 wherein said means for initiating comprises a mask adjacent said input endface which prevents the transmission of light to said endface except through a diametrically extending slit therein.

6. An optical transmission system in accordance with claim 5 wherein said slit extends along the entire diameter of said endface.

7. An optical transmission system in accordance with claim 5 wherein said slit extends along only a radius of said endface.

8. An optical transmission system in accordance with claim 5 wherein said slit comprises a plurality of segments which are separated by strips of masking material.

9. An optical transmission system in accordance with claim 5 wherein said means for directing further comprises means for changing the angle of incidence of said spatially separated beams on said input endface.

10. An optical transmission system in accordance with claim 5 wherein said means for directing further comprises means for radially displacing said spatially separated beams.

11. In an optical transmission system comprising the serial arrangement of the following components
    a light source,
    a light detector,
    at least one transmission optical fiber connected between said source and detector, and
    a dispersion transformer disposed between any two of the aforementioned components,
    said dispersion transformer being characterized in that it comprises a multimode optical fiber, means receiving light from one of said components and dispersing said light into a plurality of spatially separated beams, the position of each said beam being a function of the velocity with which the light that forms said beam propagates through said at least one transmission optical fiber, said means for receiving also directing said beams onto a portion of an input endface of said multimode fiber, said means for directing said beams comprising means for changing the angle of incidence of said spatially separated beams on said input endface, the light emanating from said multimode fiber being coupled to the next adjacent component of said system.

12. In an optical transmission system comprising the serial arrangement of the following components
    a light source,
    a light detector,
    at least one transmission optical fiber connected between said source and detector, and
    a dispersion transformer disposed between any two of the aforementioned components,
    said dispersion transformer being characterized in that it comprises a multimode optical fiber, means receiving light from one of said components and dispersing said light into a plurality of spatially separated beams, the position of each said beam being a function of the velocity with which the light that forms said beam propagates through said at least one transmission optical fiber, said means for receiving also directing said beam onto a portion of an input endface of said multimode fiber, the light emanating from said multimode fiber being coupled to the next adjacent component of said system, said multimode optical fiber comprising at least two segments connected end-to-end, said at least two segments having different refractive index profiles.

* * * * *